US011647867B2

(12) United States Patent
Kelson

(10) Patent No.: US 11,647,867 B2
(45) Date of Patent: May 16, 2023

(54) METERED SALT AND PEPPER GRINDER

(71) Applicant: James C. Kelson, Knoxville, TN (US)

(72) Inventor: James C. Kelson, Knoxville, TN (US)

( * ) Notice: Subject to any disclaimer, the term of this patent is extended or adjusted under 35 U.S.C. 154(b) by 93 days.

(21) Appl. No.: 17/305,724

(22) Filed: Jul. 14, 2021

(65) Prior Publication Data

US 2022/0015577 A1    Jan. 20, 2022

Related U.S. Application Data

(60) Provisional application No. 62/705,851, filed on Jul. 17, 2020.

(51) Int. Cl.
| A47J 42/40 | (2006.01) |
| A47J 42/04 | (2006.01) |
| A47J 42/08 | (2006.01) |
| A47J 42/46 | (2006.01) |
| A47J 42/50 | (2006.01) |

(52) U.S. Cl.
CPC .............. *A47J 42/40* (2013.01); *A47J 42/04* (2013.01); *A47J 42/08* (2013.01); *A47J 42/46* (2013.01); *A47J 42/50* (2013.01)

(58) Field of Classification Search
CPC .. A47J 42/40; A47J 42/04; A47J 42/08; A47J 42/46; A47J 42/50
See application file for complete search history.

(56) References Cited

U.S. PATENT DOCUMENTS

| 4,709,865 | A | 12/1987 | Bounds | |
| 4,844,352 | A | 7/1989 | Griffin | |
| 5,651,506 | A * | 7/1997 | Hockey | A47J 42/50 241/168 |
| 7,377,458 | B1 * | 5/2008 | Wu | A47J 42/50 241/146 |
| 7,637,447 | B2 | 12/2009 | Tang | |
| 7,975,946 | B2 | 7/2011 | Bodum | |
| 8,757,529 | B2 | 6/2014 | Tang | |
| 9,516,975 | B2 | 12/2016 | Wong | |
| 2020/0113386 | A1 * | 4/2020 | Nagrani | A47J 42/50 |

* cited by examiner

*Primary Examiner* — Matthew Katcoff
*Assistant Examiner* — Mohammed S. Alawadi
(74) *Attorney, Agent, or Firm* — Technical Attorney; Rick Barnes

(57) ABSTRACT

A dispenser for a first solid flowable material and a second flowable material, including an actuator for providing rotational motion on a shaft. A first reservoir holds the first material, and a second reservoir holds the second material. A metering unit selectively passes at least one of the first material and the second material. A grinder grinds the at least one of the first material and the second material passed by the metering unit.

17 Claims, 2 Drawing Sheets

METERED SALT AND PEPPER GRINDER

PRIORITY

This application claims rights and priority on prior U.S. provisional patent application Ser. No. 62/705,851 filed 2020 Jul. 17, the entirety of the disclosure of which is incorporated herein by reference.

FIELD

This invention relates to the field of spice dispensers. More particularly, this invention relates to a dispenser for delivering pepper and salt in a metered amount.

INTRODUCTION

Many people enjoy adding a variety of different spices to their food so as to suit their particular tastes. For example, it is very common for a patron at a restaurant to add salt and pepper to their food in differing amounts, according to their individual palette. Thus, salt and pepper shakers or grinders are often provided at restaurants for the use of their customers.

However, these dispensers as provided by the establishment are used by many different people, and thus, might not be as clean as some patrons would like. Further, in times of disease, these dispensers might not be provided at all, or if they are provided, it might not be prudent to use them.

What is needed, therefore, is an apparatus the tends to reduce issues such as those described above, at least in part.

SUMMARY

The above and other needs are met by a dispenser for a first solid flowable material and a second solid flowable material, including an actuator for providing rotational motion on a shaft. A first reservoir holds the first material, and a second reservoir holds the second material. A metering unit selectively passes at least one of the first material and the second material. A grinder is connected to the shaft, and grinds the at least one of the first material and the second material passed by the metering unit.

In various embodiments according to this aspect of the invention, the first material and the second material are both passed by the metering unit and are ground. In some embodiments, the metering unit includes a metering selector for selectively varying an amount of the first material that is passed to the grinder relative to an amount of the second material that is passed to the grinder. In some embodiments, the first reservoir and the second reservoir are disposed within the actuator. In some embodiments, an access wheel is disposed over the first reservoir and the second reservoir, and the access wheel selectively provides access for filling only a desired one of the first reservoir and the second reservoir.

In some embodiments, the grinder is comprised of an inner portion disposed within an outer portion, the inner portion and the outer portion having complimentary adjacent surfaces adapted to grind the at least one of the first material and the second material passed by the metering unit. In some embodiments, the grinder is encompassed by a casing, where the casing rotates the outer portion of the grinder and the shaft rotates the inner portion of the grinder. In some embodiments, a grinder tensor on an end of the shaft is adapted to adjust a spacing between the inner portion and the outer portion of the grinder.

DRAWINGS

Further advantages of the invention are apparent by reference to the detailed description when considered in conjunction with the figures, which are not to scale so as to more clearly show the details, wherein like reference numbers indicate like elements throughout the several views, and wherein.

DESCRIPTION

Figure 1:
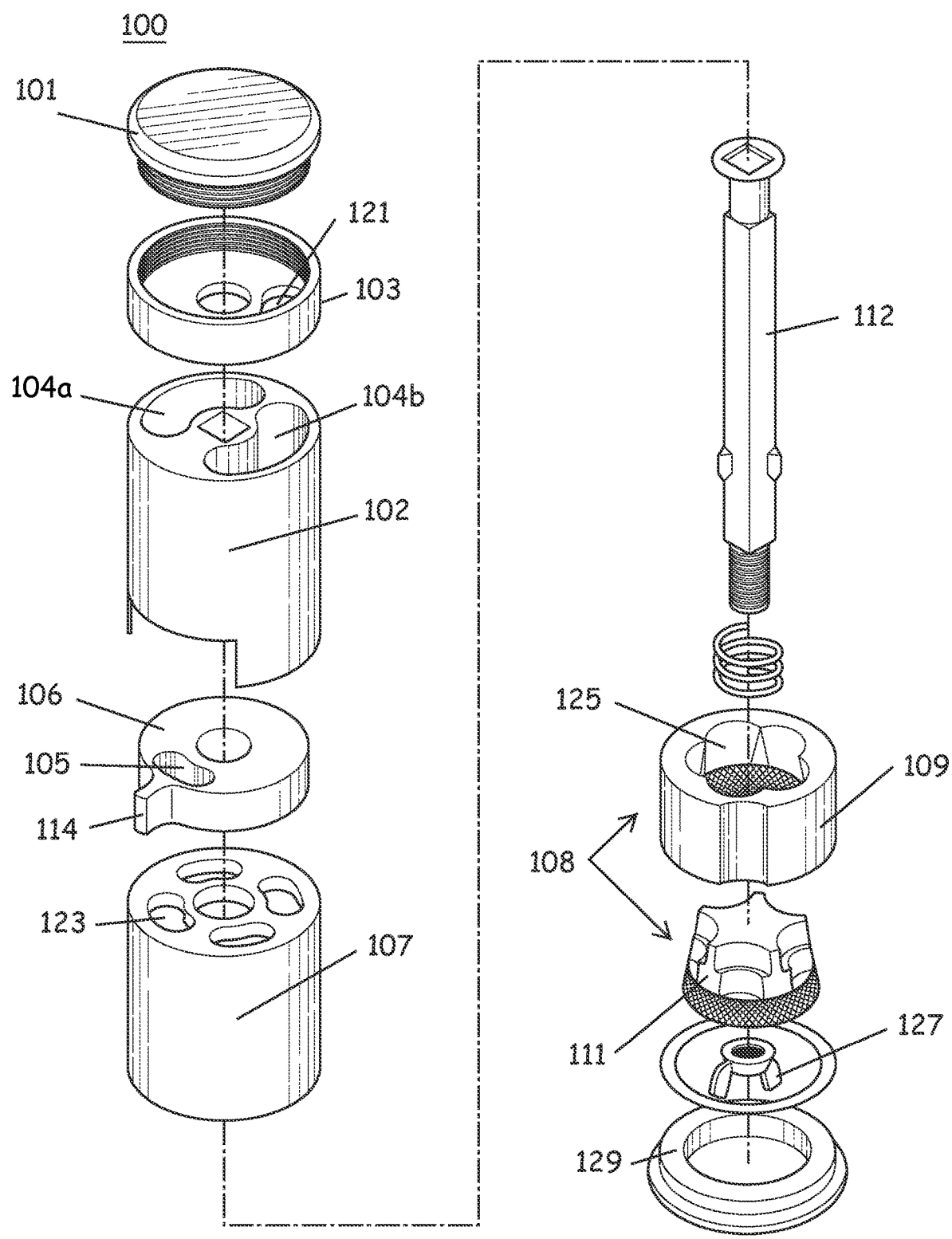
FIG. 1 is an exploded view of an apparatus according to an embodiment of the present invention.
Figure 2:
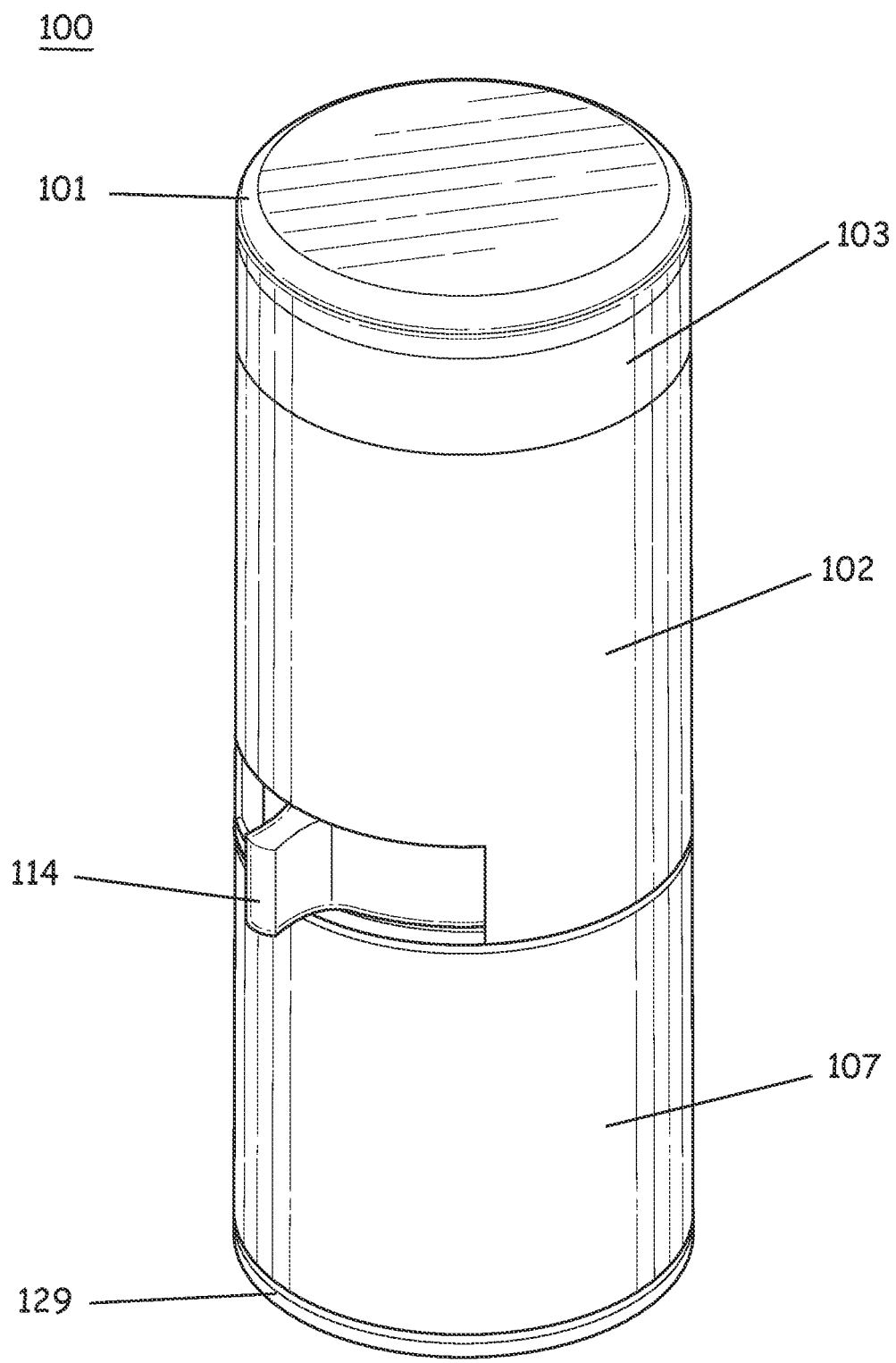
FIG. 2 is a perspective view of an apparatus according to an embodiment of the present invention.

With reference now to the figures, there is depicted a dispenser 100 according to an embodiment of the present invention. In some embodiments, the dispenser 100 has an overall length of no more than about five inches, with a diameter of no more than about one inch. The cross-sectional shape of the dispenser 100 as depicted is round, but can take many different forms in various embodiments, such as square, rectangular, round, octagonal, and so forth. The dispenser 100 can be formed of a variety of different materials, such as metal, plastic, glass, or a combination of various materials.

The dispenser 100 is designed to fit conveniently in a purse or pocket, and in some embodiments includes a clip, such as can be used to retain it in a pocket. It holds two or more different loose, flowable, solid materials, which it can dispense. For example, the dispenser 100 can be used to dispense salt, pepper, or other spices. The dispenser 100 can be retained by the user for his or her personal use, which would ensure that the dispensed materials have not been contaminated by another user. Other benefits of the dispenser 100 are described elsewhere below.

The grinder section 108 is fed by two or more reservoirs 104a and 104b, which hold the materials to be dispensed. Between the grinder 108 and the reservoirs 104a and 104b, the materials are metered in a metering section 106 which, in various embodiments, allows for one or more of selectively dispensing material from just one of the reservoirs 104a and 104b, and varying the ratio of the material dispensed from one of the reservoirs 104a in comparison to the amount of material dispensed from the other of the reservoirs 104b, such as by rotating the metering adjustment 114.

In all embodiments, the grinder 108 grinds both the first material and the second material. In other words, the first material and the second material are not ground by separate grinders. In those embodiments where both the first material and the second material are passed simultaneously to the grinder 108, the grinder 108 grinds both the first material and the second material simultaneously.

A shaft 112 leads from an actuator 102 to the grinder 108. In the embodiment as depicted, the actuator 102 is the body of the reservoirs 104a and 104b. In some embodiments the actuator 102 is manually driven by the user by twisting it relative to a casing 107 that encases the grinder 108. Rotating the actuator 102 rotates the shaft 112, but not the casing 107. The actuator 102 in one embodiment is held in one hand, while the casing 107 is held with another hand.

The outer portion 109 of the grinder 108 is engaged with and rotates with the casing 107, while the inner portion 111 of the grinder 108 is engaged with and rotates with the shaft 112. Thus, the two pieces 109 and 111 of the grinder 108 rotate in opposite directions in relation one to another, when the actuation 102 and the casing 107 are rotated in opposite directions in relation one to another. In this manner, the two pieces 109 and 111 of the grinder 108 turn against one another, grinding and dispensing the materials from one or more of the reservoirs 104a and 104b.

In some embodiments, the actuator 102 is fitted with a cap 101, which in some embodiments is a sculpted knob, such as one depicting a cat, dog, rocket, or so forth. An access wheel 103 disposed between the cap 101 and the actuator 102 is used in some embodiments to aid in filling the reservoirs 104a and 104b one at a time, having an opening 121 that can be positioned over the desired reservoir, thereby blocking flowable material from entering the other reservoir.

According to one embodiment of the invention, the dispenser 100 is used in the following manner. The cap 101 is removed from the dispenser 100, and the access wheel 103 is first turned so that the opening 121 in the access wheel 103 is disposed over reservoir 104a, which is then filled with a first material—such as salt—by pouring the first material through the opening 121 and into the reservoir 104a. When the reservoir 104a is filled to the desired level, then the access wheel 103 is turned so that the opening 121 is disposed over reservoir 104b, which is then filled with either more of the first material or, more commonly, a second material—such as pepper—by pouring the second material through the opening 121 and into the reservoir 104b. When reservoir 104b is filled to the desired level, then the cap 101 is replaced onto the dispenser 100 so that none of the two materials unintentionally spills back out of the dispenser 100.

The metering adjustment 114 of the metering section 106 is then rotated between two limits so as to position the hole 105 in a desired position below the reservoirs 104a and 104b. The reservoirs 104a and 104b each have an outlet hole (not depicted), at least a portion of each of which is in fluid communication with the hole 105 in the metering section 106 when the metering adjustment 114 is set in an intermediate position. In this position, an equal amount of material can flow out of each of the reservoirs 104a and 104b and pass through the hole 105 of the metering section 106.

By moving the metering adjustment 114 in one direction or the other, a greater or lesser amount of one of the materials in one of the reservoirs 104a and 104b can be allowed to pass through the hole 105. At the two limits of rotation of the metering adjustment 114, only one or the other of the materials in the reservoirs 104a and 104b is enabled to pass into the hold 105. Thus, using the metering adjustment 114 is, in some embodiments, a way to set a desired ratio of salt and pepper to dispense.

Once the metering adjustment 114 is set in a desired position, it remains in that position until it is set into a different position. In other words, the user does not need to set the desire ratio of the first material and the second material by adjusting the metering adjustment 114 every time that the dispenser 100 is used.

After passing through the hole 105 in the metering section 106, the materials that pass encounter the casing 107, and enter the casing 107 through the holes 123 that are disposed in the top of the casing 107, and then fall into the inner chamber 125 of the outer portion 109 of the grinder 108, where they are pressed into contact with the outer surface of the inner portion 111 of the grinder 108.

Rotating the actuator 102 while holding the casing 107 steady, or while rotating the casing 107 in an opposite direction from the actuator 102, causes the inner portion 111 and the outer portion 109 of the grinder 108 to rotate in opposite directions, one to another. The material that has fallen down into the space between the inner portion 111 and outer portion 109 is crushed and ground to a desired fineness by this action, and falls out the bottom of the dispenser 100. A grinder tensor 127, such as a wing nut threaded onto the end of the shaft 112, is used to selectively increase and decrease the space between the inner portion 111 and the outer portion 109 of the grinder 108, which provides a means for adjusting the fineness of the ground material that is dispensed.

Once the grinder tensor 127 is set in a desired position, it remains in that position until it is set into a different position. In other words, the user does not need to set the desired ground fineness of the first material and the second material by adjusting the grinder tensor 127 every time that the dispenser 100 is used.

A retaining ring 129, such as a threaded nut, retains the grinder 108 within the casing 107, in some embodiments. Screw portions or other retaining elements on either end of the shaft 112 retain the actuator 102 to the casing 107, in some embodiments. In some embodiments, the casing 107 and the outer portion 109 of the grinder 108 are united into a single piece.

As used herein, the phrase "at least one of A, B, and C" means all possible combinations of none or multiple instances of each of A, B, and C, but at least one A, or one B, or one C. For example, and without limitation: A×1, A×2+B×1, C×2, A×1+B×1+C×1, A×1+B×12+C×113. It does not mean A×0+B×0+C×0.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A dispenser for a first solid flowable material and a second flowable material, the dispenser comprising:
   an actuator for providing rotational motion on a shaft,
   a first reservoir for holding the first material,
   a second reservoir for holding the second material,
   wherein the first reservoir and the second reservoir are disposed within the actuator,
   a metering unit for the first material and the second material, and
   a grinder connected to the shaft, for grinding the at least one of the first material and the second material passed by the metering unit.

2. The dispenser of claim 1, wherein the first material and the second material are both passed by the metering unit and are ground by the grinder.

3. The dispenser of claim 1, wherein the metering unit includes a metering adjustment for selectively varying an amount of the first material that is passed to the grinder relative to an amount of the second material that is passed to the grinder.

4. The dispenser of claim 1, further comprising an access wheel disposed over the first reservoir and the second reservoir, the access wheel selectively providing access for filling only a desired one of the first reservoir and the second reservoir.

5. The dispenser of claim 1, wherein the grinder is comprised of an inner portion disposed within an outer portion, the inner portion and the outer portion having complimentary adjacent surfaces adapted to grind the at least one of the first material and the second material passed by the metering unit.

6. The dispenser of claim 1, wherein the grinder is encompassed by a casing, where the casing rotates an outer portion of the grinder and the shaft rotates an inner portion of the grinder.

7. The dispenser of claim 1, wherein a grinder tensor on an end of the shaft is adapted to adjust a spacing between an inner portion and an outer portion of the grinder.

8. A dispenser for a first solid flowable material and a second flowable material, the dispenser comprising:
an actuator for providing rotational motion on a shaft,
a first reservoir for holding the first material,
a second reservoir for holding the second material,
wherein the first reservoir and the second reservoir are disposed within the actuator,
a metering unit for selectively passing at least one of the first material and the second material, and
a grinder connected to the shaft, for grinding the at least one of the first material and the second material passed by the metering unit, the grinder comprising an inner portion disposed within an outer portion, the inner portion and the outer portion having complimentary adjacent surfaces adapted to grind the at least one of the first material and the second material passed by the metering unit.

9. The dispenser of claim 8, wherein the first material and the second material are both passed by the metering unit and are ground by the grinder.

10. The dispenser of claim 8, wherein the metering unit includes a metering adjustment for selectively varying an amount of the first material that is passed to the grinder relative to an amount of the second material that is passed to the grinder.

11. The dispenser of claim 8, further comprising an access wheel disposed over the first reservoir and the second reservoir, the access wheel selectively providing access for filling only a desired one of the first reservoir and the second reservoir.

12. The dispenser of claim 8, wherein the grinder is encompassed by a casing, where the casing rotates the outer portion of the grinder and the shaft rotates the inner portion of the grinder.

13. The dispenser of claim 8, wherein a grinder tensor on an end of the shaft is adapted to adjust a spacing between the inner portion and the outer portion of the grinder.

14. A dispenser for a first solid flowable material and a second flowable material, the dispenser comprising:
an actuator for providing rotational motion on a shaft,
a first reservoir for holding the first material,
a second reservoir for holding the second material,
wherein the first reservoir and the second reservoir are disposed within the actuator,
a metering unit for selectively passing at least one of the first material and the second material,
a grinder connected to the shaft, for grinding the at least one of the first material and the second material passed by the metering unit, the grinder comprising an inner portion disposed within an outer portion, the inner portion and the outer portion having complimentary adjacent surfaces adapted to grind the at least one of the first material and the second material passed by the metering unit,
a casing encompassing the grinder, wherein the casing rotates the outer portion of the grinder and the shaft rotates the inner portion of the grinder, and
a grinder tensor on an end of the shaft to adjust a spacing between the inner portion and the outer portion of the grinder.

15. The dispenser of claim 14, wherein the first material and the second material are both passed by the metering unit and are ground by the grinder.

16. The dispenser of claim 14, wherein the metering unit includes a metering adjustment for selectively varying an amount of the first material that is passed to the grinder relative to an amount of the second material that is passed to the grinder.

17. The dispenser of claim 14, further comprising an access wheel disposed over the first reservoir and the second reservoir, the access wheel selectively providing access for filling only a desired one of the first reservoir and the second reservoir.

* * * * *